(12) United States Patent
Schneidau et al.

(10) Patent No.: US 8,978,947 B1
(45) Date of Patent: Mar. 17, 2015

(54) TOUCH DEVICE HOLDER FOR INFANT TRANSPORT APPARATUS

(71) Applicants: Timothy Schneidau, Arlington, VA (US); Heather Prattas, Surfside, FL (US)

(72) Inventors: Timothy Schneidau, Arlington, VA (US); Heather Prattas, Surfside, FL (US)

( * ) Notice: Subject to any disclaimer, the term of this patent is extended or adjusted under 35 U.S.C. 154(b) by 0 days.

(21) Appl. No.: 13/936,323

(22) Filed: Jul. 8, 2013

Related U.S. Application Data

(63) Continuation of application No. 12/388,764, filed on Feb. 19, 2009, now Pat. No. 8,479,961.

(51) Int. Cl.
| | |
|---|---|
| *B60R 11/00* | (2006.01) |
| *B62B 9/00* | (2006.01) |
| *B60R 11/02* | (2006.01) |
| *B62B 9/26* | (2006.01) |

(52) U.S. Cl.
CPC . *B60R 11/02* (2013.01); *B62B 9/26* (2013.01); *B62B 2202/56* (2013.01); *Y10S 224/929* (2013.01)
USPC .......................... 224/409; 224/929; 280/47.38

(58) Field of Classification Search
USPC ......... 224/275, 409, 572, 929, 555, 426, 407; 248/218.4; 280/47.38; 220/475; 211/119.007; 297/188.06
See application file for complete search history.

(56) References Cited

U.S. PATENT DOCUMENTS

| | | | | |
|---|---|---|---|---|
| 1,708,906 | A * | 4/1929 | Sparks et al. | 224/409 |
| 4,398,748 | A * | 8/1983 | Duvignacq | 280/644 |
| 5,354,119 | A * | 10/1994 | Nicholas | 297/188.07 |
| 5,704,527 | A * | 1/1998 | Struzer | 224/547 |
| 5,842,715 | A * | 12/1998 | Jones | 280/727 |
| 6,126,927 | A * | 10/2000 | Provancal et al. | 424/65 |
| 6,663,155 | B1 * | 12/2003 | Malone et al. | 296/37.8 |
| 6,766,930 | B2 * | 7/2004 | Dixon et al. | 224/409 |
| 7,207,469 | B2 * | 4/2007 | Hussaini et al. | 224/275 |
| 7,301,757 | B2 * | 11/2007 | Lee et al. | 361/679.27 |
| 7,487,978 | B2 * | 2/2009 | Tutmaz et al. | 280/47.38 |
| 7,487,979 | B2 * | 2/2009 | Ferraioli | 280/47.38 |
| 7,861,991 | B1 * | 1/2011 | Sylvertooth-Jackson | 248/274.1 |
| 2002/0102908 | A1 * | 8/2002 | Chan | 446/269 |
| 2005/0023312 | A1 * | 2/2005 | Steinberg | 224/275 |
| 2005/0105254 | A1 * | 5/2005 | Lee et al. | 361/679 |
| 2006/0113342 | A1 * | 6/2006 | Hampton et al. | 224/409 |
| 2008/0111331 | A1 * | 5/2008 | Koehl | 280/47.38 |
| 2009/0188881 | A1 * | 7/2009 | Travis | 211/131.1 |

* cited by examiner

*Primary Examiner* — Justin Larson
(74) *Attorney, Agent, or Firm* — Patents on Demand P.A.; Brian K. Buchheit; Scott M. Garrett

(57) ABSTRACT

A device holder for a stroller permits storage and use of a touch-screen electronic device by a child in the stroller. The device holder is for securing an electronic device between handlebars of the stroller. The stroller includes a user storage compartment with a concavity for holding a child in the stroller. The stroller is rear-facing such that when the child is positioned in the concavity, the child faces a direction of the handlebars. A main body surface of the device holder forms a plane extending between the handlebars of the stroller filling a void otherwise existent between the handlebars. The main body surface includes an area for securely attaching an electronic device to the main body surface to position the electronic device between the handlebars of the stroller. A positioned electronic device comprises a screen for visibly presenting media to the child positioned in the concavity.

19 Claims, 16 Drawing Sheets

TOUCH DEVICE HOLDER FOR INFANT TRANSPORT APPARATUS

CROSS-REFERENCE TO RELATED APPLICATIONS

This Application is a continuation-in-part of U.S. application Ser. No. 12/388,764 now issued U.S. Pat. No. 8,479,961 titled "Device Holder of a Transport Apparatus", which is incorporated by reference in its entirety.

BACKGROUND

The present general inventive concept generally relates to a touch device holder, and more particularly, to a touch device holder capable of being attached to a transport apparatus, such as a stroller.

Various features have been developed in order to enhance a comfort level of a user of a transport apparatus, such as a stroller. However, these features are often limited to enhancing a comfort level of the user who moves and navigates the stroller (hereinafter "user"), rather than a user, such as a child, being transported by the stroller (hereinafter "rider").

For example, a conventional beverage holder has been previously developed which includes a beverage containing receptacle and a clip which affixes to a handle bar from which the user moves and navigates the transport apparatus. However, the conventional beverage holder does not directly enhance a comfort level of the rider, since the beverage holder is disposed at some distance away from the rider. Accordingly, it is very difficult for the rider to access or use the conventional beverage holder.

Furthermore, conventional armbands have also been developed which are used to carry small portable media devices. However, these conventional armbands are not capable of being affixed to the transport apparatus in such a manner as to provide access to the media device stored therein to the rider.

Accordingly, a device holder capable of being affixed to a transport apparatus, such as a rearward facing stroller, which provides a user being transported direct access to the device stored therein is desired.

DETAILED DESCRIPTION

Item management and organization is a challenge to parents of infants, toddlers, and small children. A myriad of paraphernalia, such as diapers, bottles, wipes, drinks, and the like are managed in a portable manner. This disclosure provides a convenient mechanism for storing many of these traditional paraphernalia, along with an emerging one (a portable touch-display device, such as an ANDROID® TABLET, an IPAD®, WINDOWS® RT DEVICE, and the like) in a baby stroller or stroller system.

Figure 12:
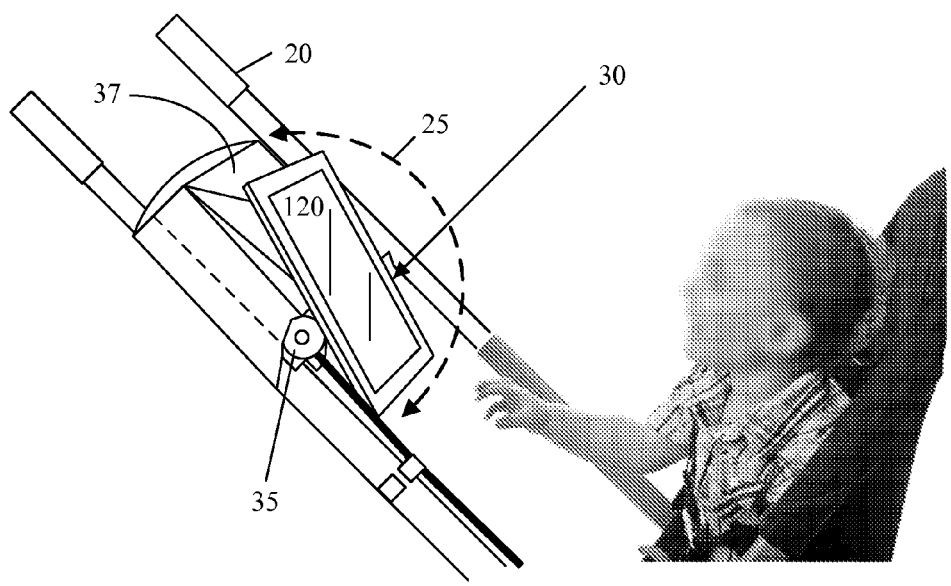
FIG. 12 is a side perspective in use view of an exemplary embodiment of a device holder according to the present general inventive concept.
Figure 13:
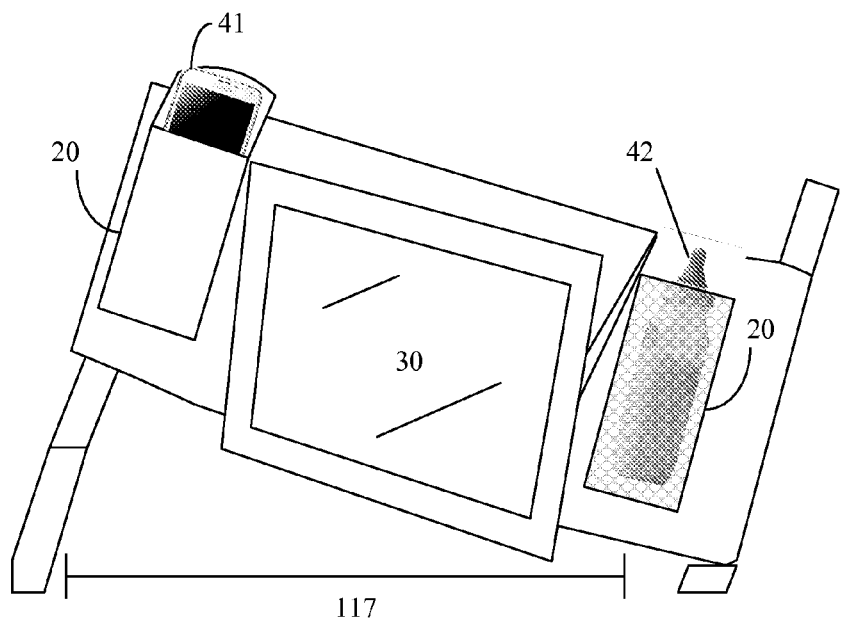
FIG. 13 is a front perspective view of an exemplary embodiment of a device holder according to the present general inventive concept.
Figure 15:
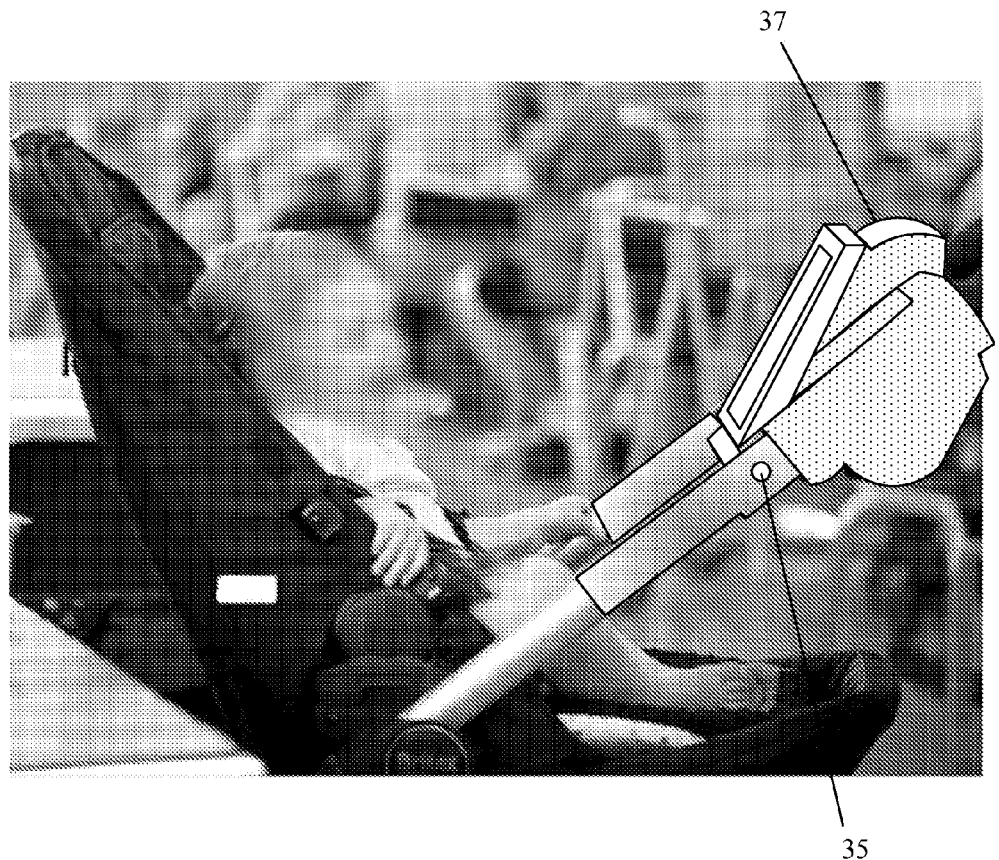
FIG. 15 is a side perspective in use view of an exemplary embodiment of a device holder according to the present general inventive concept.
Figure 16:
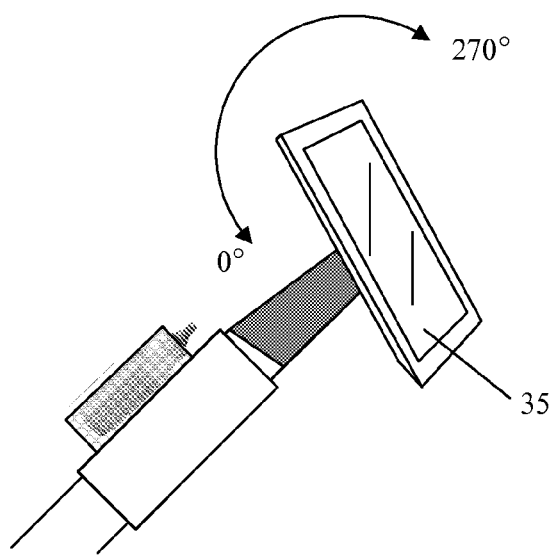
FIG. 16 is a side perspective in use view of an exemplary embodiment of a device holder according to the present general inventive concept.

Significantly, the disclosed holder keeps the touch device safe, while permitting a toddler/infant/child, referred generically herein as a child, to interact, as shown for example in FIGS. 12 and 15. In one embodiment, the line of sight of the touch-device is deliberately placed in the line-of-sight of the child, which permits the child be entertained by the device without substantially increasing overall encumbrance on a parent or caregiver. In embodiment, additional storage is provided between the handlebars for quick access items, as shown by FIG. 13 for example. In one embodiment, the storage organizer can adjust, to permit a viewing angle to change, which allows a parent to view/manipulate the stroller attached touch-device, as shown by FIG. 16. In embodiments of the disclosure, an ability to operate and utilize a device for a parent or child depending on desire in a hands-free fashion can be a time, sanity, and device saver.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Although embodiments of the disclosure are illustrated as being affixed to a rear-facing stroller, the disclosure is not limited to this type of transport apparatus. That is, in contemplated embodiments, the disclosure may also be capable of being affixed to other types of user transport apparatuses, including but not limited to, forward facing strollers, detachable baby/toddler car seats, wagons, wheel-chairs, baby bicycle trailer (e.g,. BURLEY®, CHARIOT®, INSTEP®, and other such trailers), bicycle front-seat extensions (e.g., IBERT®, YEPP MINI®, BOBIKE MINI®, WEERIDE®, and the like), and other such child transport apparatuses. In addition, although the disclosure contemplates touch-screen devices, other devices are to be considered within the scope. For example, a DVD players, a smart phone, a personal digital assistant (PDA), a video game system, and the like are contemplated in embodiments.

Figure 1:
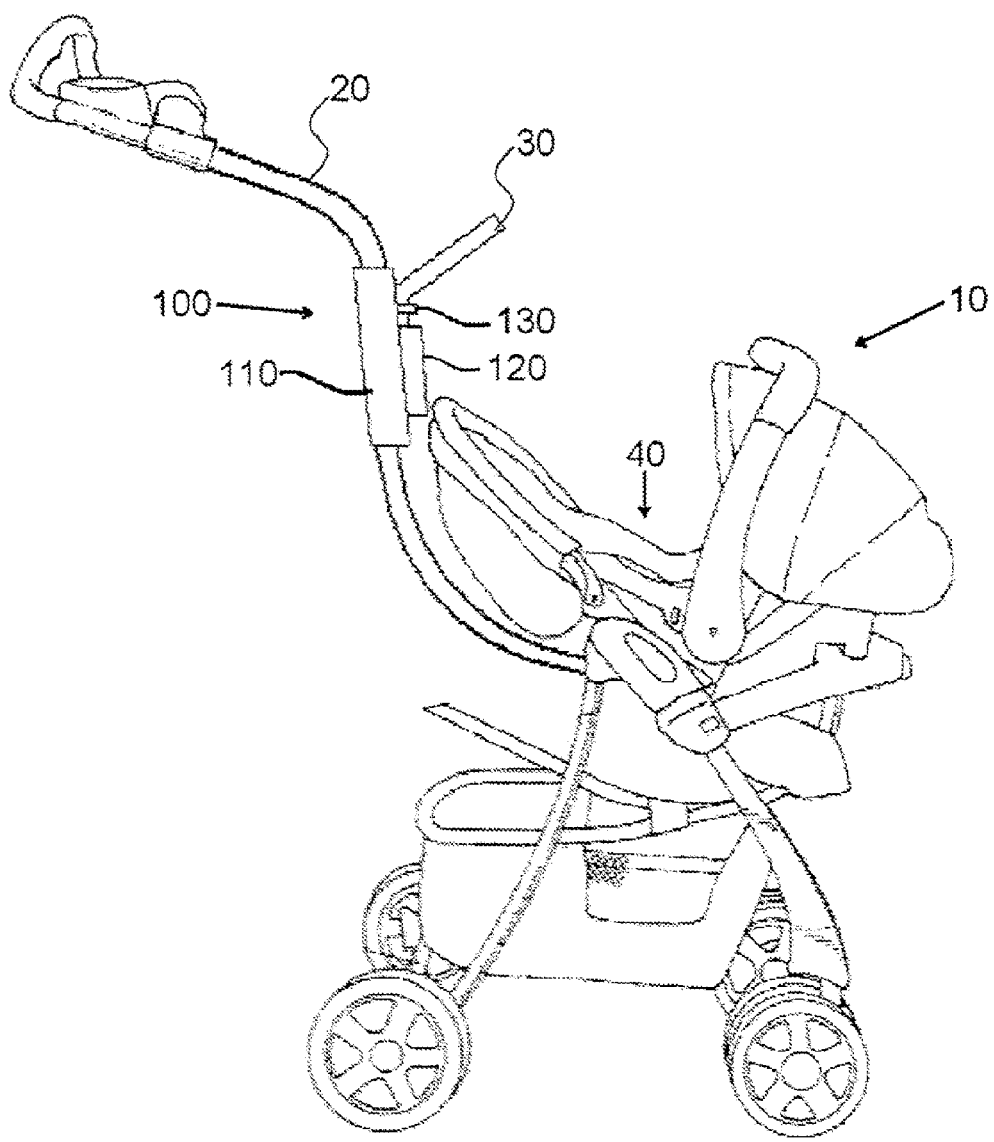
FIG. 1 is a front perspective view illustrating a device holder according to an exemplary embodiment of the present general inventive concept.
Figure 2:
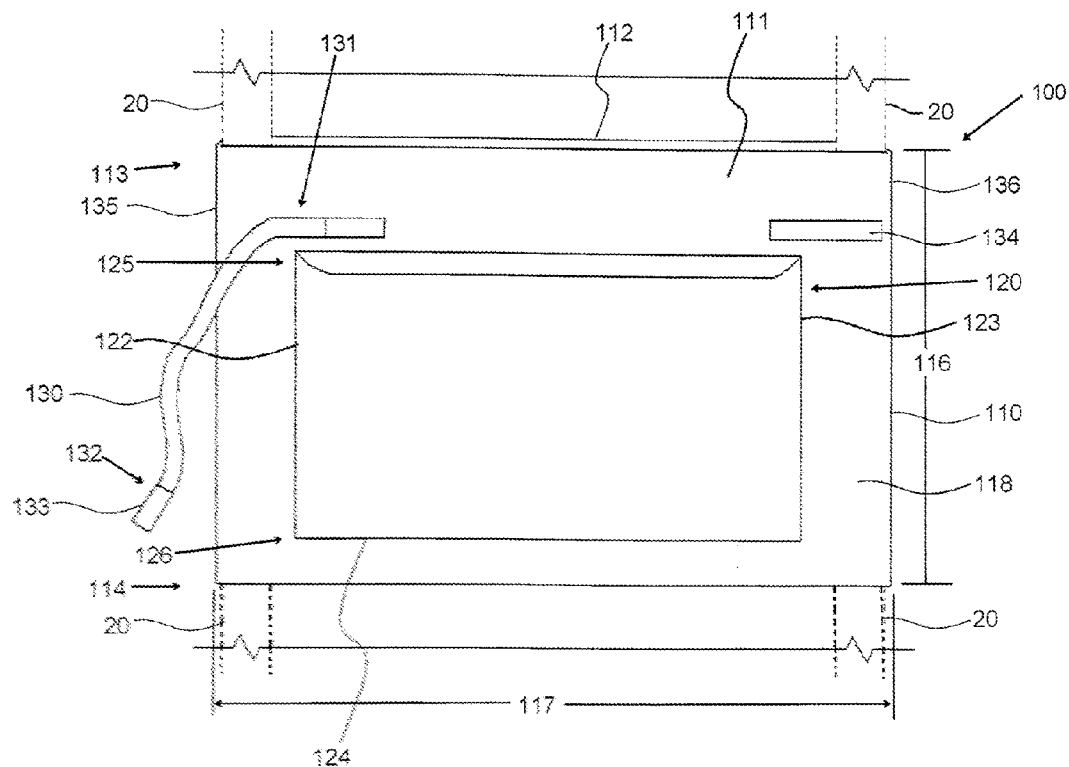
FIG. 2 is a front perspective view of the device holder of FIG. 1.
Figure 3:
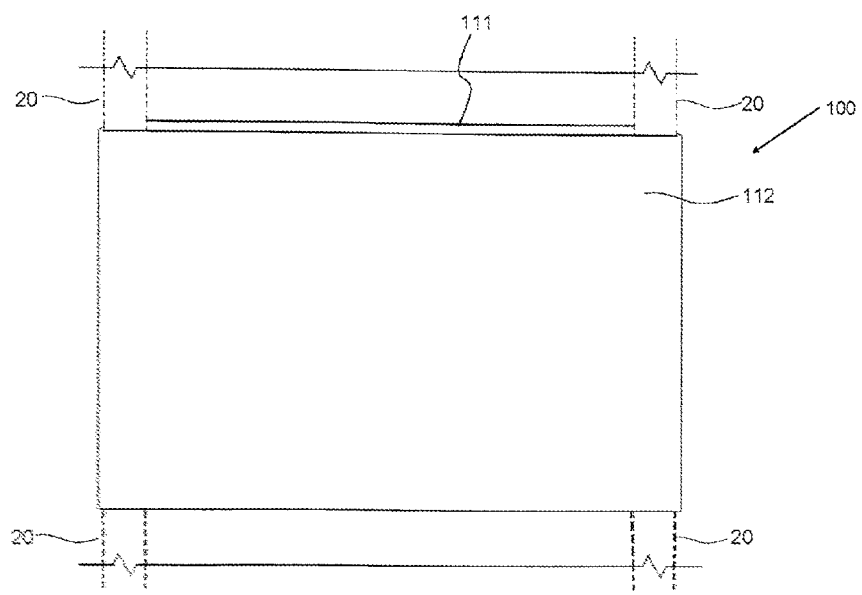
FIG. 3 is a back perspective view of the device holder of FIG. 1.
Figure 4:
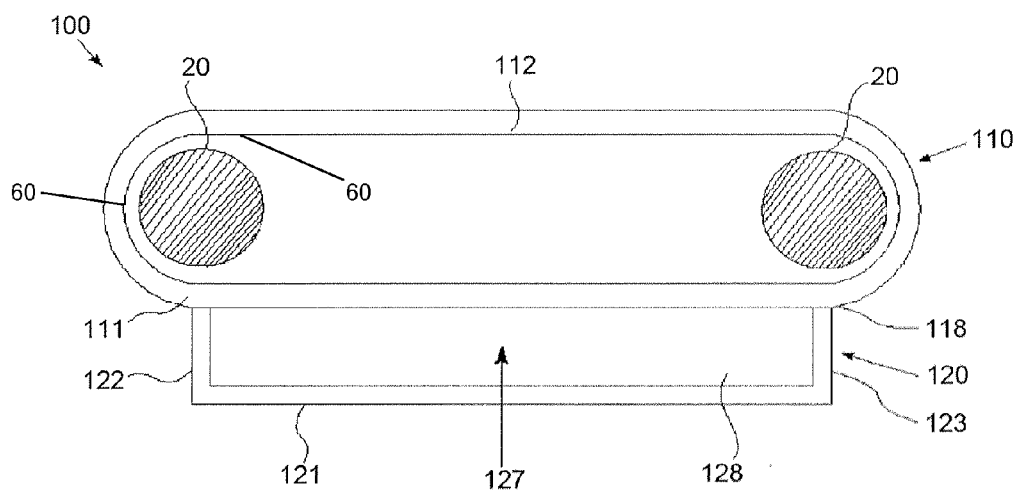
FIG. 4 is a top cross-sectional view of the device holder of FIG. 1.

FIG. 1 is a front perspective view illustrating an embodiment of a touch-screen device holder according inventive arrangements disclosed herein. FIG. 2 is a front perspective view of the touch-screen device holder according to inventive arrangements. FIG. 3 is a back perspective view of the touch-screen device holder according to inventive arrangements disclosed herein. FIG. 4 is a top plan cross-sectional view of the touch-screen device holder according to inventive arrangements disclosed herein.

Figure 14:
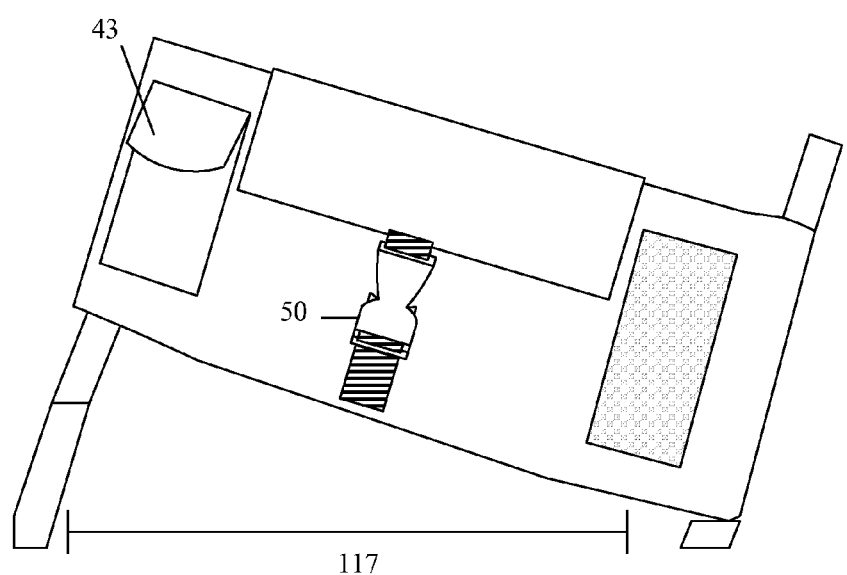
FIG. 14 is a view of an exemplary attachment mechanism embodiment of a device holder according to the present general inventive concept.

FIG. 13 shows a front-view of a specific embodiment of the touch-screen holder positioned between handlebars of a stroller in accordance to inventive arrangements disclosed herein. FIG. 14 shows a back-view of a specific embodiment of the touch-screen device holder positioned between handlebars of a stroller in accordance to inventive arrangements disclosed herein. FIG. 12 and FIG. 15 show in-use views of the touch-screen device holder for a rear-facing stroller in accordance to inventive arrangements disclosed herein. FIG. 15 shows an in-use view of the touch-screen device holder for a stroller. FIG. 16 shows a configuration for a parent-view of the touch-screen device holder in a rear facing stroller in accordance to inventive arrangements detailer herein. FIG. 12-16 are specific embodiments able to be implemented in accordance with details expressed in FIG. 1-4.

Referring to the drawings, FIGS. 1 through 4 illustrate an exemplary embodiment of a device holder 100 according to the embodiments of the disclosure. The device holder 100 includes a main body 110 and a device storage compartment 120. As illustrated in FIG. 1, the device holder 100 may be detachably coupled to handle bars 20 of a user transport apparatus 10, such as a stroller, so that a device 30 stored within the device storage compartment 120 may be visible from a child compartment 40 of the stroller 10. In one embodiment, the device holder 100 may be integrated into the stroller 10 in an embedded, semi-embedded, or substantially non-detachable matter. For example, in one embodiment attachment/detachment of the device holder 100 may require use of tools, such as a screwdriver, racket, Allen wrench, and the like. The device holder 100 may be made of a rigid plastic or other solid and approximately inflexible material designed for the specific circumference of the handle bars 20 and length between bars 20 of the stroller 10. In another embodiment, the device holder 110 can be formed from a fabric, which is able to be affixed (e.g., Velcro, adjustable straps, etc.) about the handlebars 20 of the stroller 10 in a secure fashion. A hybrid collection of different materials for the device holder 100 are contemplated for embodiments of the disclosure.

In some embodiments, the device holder 100 may be detachably coupled to various other portions of the stroller 10 so that a child placed within a user storage compartment 40 may have a clear line of sight to a device 30 stored within the device storage compartment 120. A line of sight refers to an angle for viewing a screen 30 of the device. A ninety degree angle (approximately orthogonal to the plane of the screen) and is a "baseline" for a line of sight, where a range of plus/minus thirty five degrees may be within viewing parameters of the device 30. Different screens for device 30 can have known optimized viewing angles, which may be dependent on lighting conditions, and these device 30 specific angles are relevant for determining a line of sight proper for a device holder 100 in a given usage situation.

Compartment 40 is a volumetric space in which a child resides. This space can be a reclining one, as shown in FIG. 1 and FIG. 16, can be designed for a child sitting upright (as shown by FIGS. 12 and 15), or can be a largely unrestrained volume (such as a volumetric area for passengers of a Wagon).

FIG. 12 and FIG. 15 both show the device holder 100 positioned for a child sitting in a rear-facing stroller. The device holder 100 is positioned between the handlebars 20 of the stroller 10. The touch-screen device 30 may be within touch range of the child, as shown in FIG. 12, or may be slightly outside the touch range in absence of the child sitting fully upright, as shown by FIG. 15.

The device holder 100 may be able to be tilted for a "more optimal" viewing angle. Using FIG. 1 as a reference, the device 30 may be connected to the device holder 100 around a pivot point 35. The pivot point 35 can permit a screen of a device 30 to be adjusted for different angles 25. In one embodiment, angles 25 (e.g., FIG. 16) between zero and three-hundred and sixty degrees are possible. When at a zero angle 25 in FIG. 1, a child in the carrier 40 may see a backside (opposite of a screen) of the device 30. When at a 130 degree angle 25, a child in the carrier 40 may have an optimal or at least a reasonable viewing of a screen. When at a two hundred and seventy degree angle 25, a parent pushing the stroller may be able to easily see playback on a screen of the device 30. Mechanisms are contemplated to lock the screen able to pivot along a pivot point 35 at any of a variety of angles of use.

Turning to FIG. 12, a pivot point 35 is formed toward a bottom of the device holder 100. A predefined distance of a top mounted plane 36 results in an angle adjustment so that a child sitting in the carrier 40 is able to have an improved angle. FIG. 15 also shows an adjustment in a viewing angle caused by a top positioned extender 37. The pivot point 35 in FIG. 15 is also bottom mounted. FIG. 16 shows how the angle adjustment available via the device holder 100 permits a person pushing the handles 20 to view the surface of the device 30.

Referring now to FIGS. 2 and 3, in embodiments, the main body 110 of the device holder 100 includes front and back sides 111 and 112 and top and bottom ends 113 and 114. The main body 110 may have a predetermined height 116 which may correspond to a desired dimension of a device 30 to be stored thereby and a predetermined width 117 which may correspond to a desired dimension of the stroller 10. Specifically, the width 117 can correspond to a width between handlebars 20 of the stroller 10, as the device holder 100 can be designed to position the screen of the device 30 between the handlebars 20. In one embodiment, the device 30 can occupy a volumetric void between the handlebars. For example, the overall depth of the device holder 100 when positioned can be approximately equal to a radius of the handlebars 20 times two. This arrangement permits the device holder 100 to form a plane approximately equivalent to that of the handlebars 20, which can be highly beneficial for folding many strollers, which an excessive depth would otherwise prevent folding, or would require the removal of the device holder 100 from between the handlebars 20 during a stroller-folding process.

The depth need not be perfectly matching the radius of the handlebars 20 times two, as any depth, which permits the stroller 10 to fold in its typical fashion, which may be a variation of the radius time two, which is dependent on stroller design), is functionally beneficial (enables folding without removing the device holder 100). For example, FIG. 13 shows the device holder 100 with a depth slightly greater than two times the radius of the handlebars 20. The addition permits the device holder 100 to fit around the handlebars 20, and form a substantially planar surface for holding the device 30 and other items. As shown in FIG. 13, additional pockets 41, 42 for a mobile phone and a bottle exist. Others are contemplated. Different form factors for touch devices (7 inch, 10 inch, and the like) determine the amount of area (of a child facing plane) consumed by the device 30. The remaining space can be utilized for additional storage and/or for peripherals related to the device 30 (e.g., an additional battery for extended use, a set of speakers, etc.). The width between handlebars 20 can vary between different stroller designs. Further, some stroller handlebars are designed to fold-into each other, in which case the device holder 100 may also automatically fold/reposition the device 30, so as to permit quick stroller compaction/expansion (for taking in/out of a trunk, for example) without removing the device holder. FIG. 14 shows an embodiment of a backside of the device holder 100, which includes an additional storage pocket 43, and a device angle adjuster 50.

In some embodiments, the width 115 of the main body 110 may correspond to a distance between two handle bars 20 (possibly adjusted to be slightly greater to surround the perimeter of the outer surface of the handle bars 20, or slightly less to entirely fit inside the inner surface of the handlebars 20) of the stroller 10, and the height 116 of the main body 110 may correspond with a desired portion of the handle bars 20. Frictive surfaces (e.g., rubber is a good frictive surface functioning against plastic/meta of a handlebar 20 surface) can be added in some embodiments, to establish a high co-efficient of friction between the device holder 110 surface 60 (e.g., FIG. 4) and a surface portion of the stroller (e.g., handlebar 20 surface) to prevent unintentional sliding of the device holder after it is positioned in a desired location relative to the handle-bars. In one embodiment, the positioning of the device holder 110 is such that telescoping functions of the stroller 10 are not impeded (for adjusting the handlebar height). In other embodiments, clamps, pins, top and/or bottom position holders (fixed about the circumference of each handlebar) and other mechanisms are able to be utilized to secure a relative position of the device holder 100 to the stroller 20.

In an exemplary embodiment, the front side 111 and the back side 112 of the main body 110 may be integrally formed from a single sheet of material into various shapes, such as a cylindrical shape (see FIGS. 2 through 4). This sheet of material may be flexible, such as made of fabric and/or may be rigid, such as made of a rigid plastic. When a fabric outer surface is utilized (as shown in FIGS. 14 and 15, for example) a rigid interior material, such as a metal, wood, plastic, and the like, can be utilized for stability and to add extra rigidity to the plane formed by the device holder 100 in contemplated embodiments.

In some embodiments, the main body 110 may include various elastic materials which allow the main body 110 to be easily installed onto and/or over the handle bars 20 of the stroller 10. However, the present general inventive concept is not limited thereto. That is, in alternative exemplary embodiments, the main body 110 may be formed of multiple sheets of other materials, such as thermoplastics, which may be detachably coupled to the handle bars 20 of the stroller 10. Combinations of different materials and elements can also be utilized. These combinations can enable desired properties (such as an ability to fold the stroller without removing the device holder 110), while still achieving a level of support for the device 30 and other storage compartments, when in use.

Referring to FIGS. 2 and 4, the device holder 100 includes the device storage compartment 120 coupled to a surface 118 of the main body 110. The device storage compartment 120 may include a front wall 121, first and second sidewalls 122 and 123, and a bottom wall 124. In addition, the device storage compartment 120 has a top end 125 and a bottom end 126 which respectively correspond with the top and bottom ends 113 and 114 of the main body 110. As evident from FIGS. 13 and 15, the front wall 121 can be a substantially planar surface. It may extend significantly beyond a plane formed from the handle bar 20 in one embodiment (as shown it extends beyond the handlebar plane at a distance corresponding to the length of the first and second sidewalls 122 and 123. In another embodiment, a concavity cavity can form between the handle bars 20, within which the device 30 is able to be positioned, to minimize its extension beyond a plane formed from the handle bars. As shown by FIG. 13, multiple different compartments 41, 42 (with different sidewalls) are contemplated in one embodiment.

In further exemplary embodiments, the front wall 121, the first and second sidewalls 122 and 123, and the bottom wall 124 may define a cavity 127, wherein a device 30 (see FIG. 5), such as a DVD player, may be stored. As noted, this cavity 127 may at least be contained partially within the space between the handlebars 20. In addition, the device storage compartment 120 includes an opening 128 disposed at the top end 125 of the device storage compartment 120 to provide access to the cavity 127. The device 30 may be stored within the cavity 127 of the device storage compartment 120.

In one embodiment, instead of a cavity 127, the device can include a holder (which grips the sides of the device 30), or can include a hook-and-loop fastener mechanism for attaching/detaching the device (See embodiments shown in FIG. 13, for example).

In some embodiments, the device storage compartment 120 may further include a cover (not illustrated) disposed at the top end 125 of the device storage compartment 120 which may be used to close the cavity 127 from an external environment. That is, the cover may be used to completely isolate the cavity 127 from the external environment.

In further exemplary embodiments, the main body 110, the device storage compartment 120, and/or the cover may be formed of a material which protects the device 30 from the external environment. For example, in an exemplary embodiment, the main body 110 may be formed of material which is waterproof or water resistant in order to protect the device 30, which may be stored within the device storage compartment 120, from moisture. However, the inventive concept is not limited thereto. That is, in contemplated embodiments, the main body 110 may formed of a material which may protect the device 30 from electrostatic discharge (ESD). In addition, in alternative exemplary embodiments, the main body 110 and the device storage compartment 120 may be formed of various other materials, shapes, and sizes, as desired.

In some embodiments, the device storage compartment 120 may be formed of a similar or substantially similar material as that of the main body 110. However, the inventive concept is not limited thereto. However, the present general inventive concept is not limited thereto. That is, in some embodiments, the device storage compartment 120 may include a plastic or metal portion in order to provide structural support from the storage compartment 120 and also to protect the device 30 stored therein from external forces.

In alternative exemplary embodiments, the cavity 127 which is defined by the device storage compartment 120 may also provide storage for the device 30 while the device 20 is not in use. For example, as illustrated in FIG. 1, the device storage compartment 120 provides storage for the device 30 while the device 30 is being used. However, although not illustrated, the device storage compartment 120 may also provide storage for the device 30, when the device 30 is not being used.

In an alternative exemplary embodiment, referring now to FIG. 2, the main body 110 may further include a fixing member 130 which has a freely disposed first end 131 and a second end 132 which is coupled to the surface 118 of the main body 110. In exemplary embodiments, the fixing member 130 may be disposed between the top end 113 of the main body 110 and the top end 125 of the device storage compartment 120. In one embodiment, the device storage compartment 120 may be removable, to minimize bulk when the stroller is folded, permitting folding without removing the device holder 110 (which still requires removal of the device 30 and storage compartment 120, which otherwise would inhibit proper folding of the stroller.

In further exemplary embodiments, the fixing member 130 may be formed in various shapes, such as rectangular or cylindrical shape. The fixing member 130 may be made from an elastic or non-elastic type material. However, the present general inventive concept is not limited thereto. That is, the fixing member 130 may be formed in various other shapes and/or materials, as desired. The fixing member 130 may in some embodiments assist in folding or guiding a fold of the device holder 100 for easy storage when a stroller is compacted (folded).

In exemplary embodiments, the first end 131 of the fixing member 130 may be attached to the surface 118 of the main body surface, and the second end 132 may be detachably coupled to the main body surface 118. In the current exemplary embodiment, the first end 131 of the fixing member 130 may be attached to an area of the surface 118 of the main body 110 disposed between a first side 135 of the main body 110 and the first sidewall 122 of the device storage compartment 120.

The second end 132 of the fixing member 130 may include a first securing portion 133, such as a portion of Velcro™, a hook, a button, a snap, or other coupling device, attached thereto in order to be detachably coupled to a second securing portion 134, such as a portion of Velcro™, a hook, a button, a snap, or other coupling device, which is coupled to the surface 118 of the main body 110.

In the one embodiment, the second securing portion 134 may be coupled to an area of the surface 118 of the main body 110 disposed between a second side 136 of the main body 110 and the second sidewall 123 of the device storage compartment 120.

Embodiments, where the storage device 100 is made of fabric, the fixing member may include straps, which make the surface of the device holder 110 taught relative to the handle bars 20, where friction is utilized to retain the position thereafter. In other embodiments, snap fasteners (in an interior of the fabric, so that once positioned about the handlebars, the device holder fits "snuggly", lacing holes (for lacing a ribbon, rope, or other material about the handlebars (e.g., like eyeholes in shoes for attaching strings) may be used to secure the device holder 100 to the handlebars 20. A form and nature of the fixing member 130 is not to be limited, so long as the fixing member permits the device holder 110 to be affixed to the handlebars 20 in a relative stable position, in a manner enabling the device holder to support the included device 30.

In exemplary embodiments, as illustrated in FIGS. 1 through 4, the device holder 100 may be installed over the handle bar 20 portion of a stroller 10. The device storage compartment 120 may then be positioned such that a child disposed within the user storage compartment 40 may have a clear line of sight to a device 30 which may be held by the device holder 100. Generally a clear line of sight positions a surface of a screen at approximately a ninety degree angle to eyes of a child, properly positioned within the cavity 40.

Figure 5:
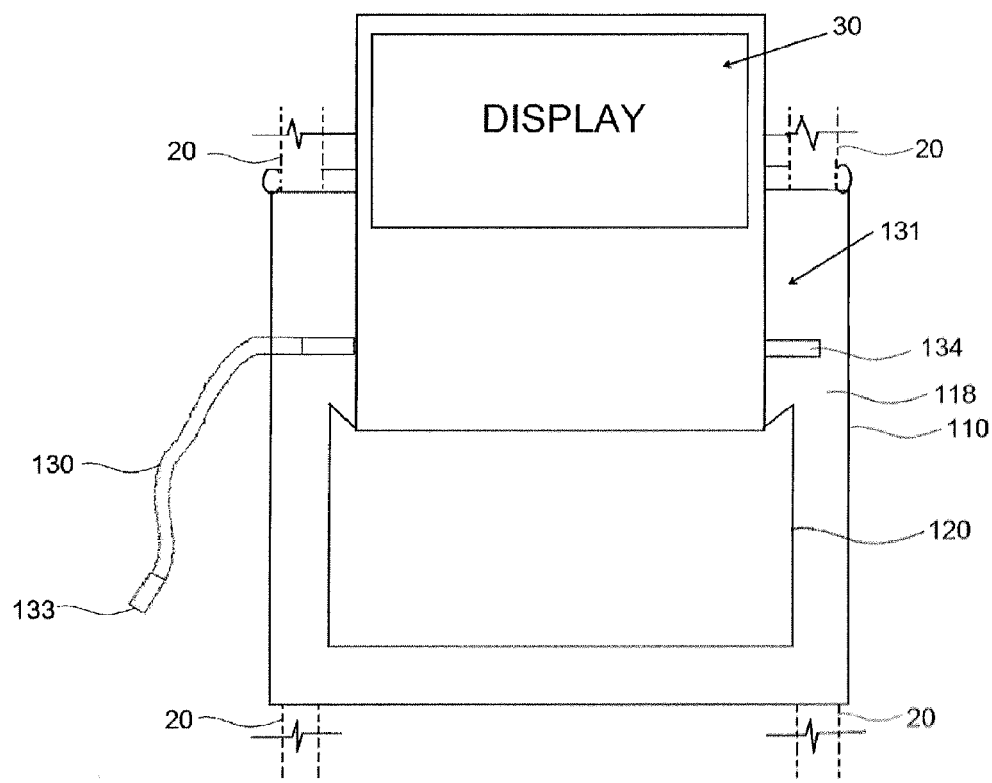
FIG. 5 is a front perspective view of the device holder of FIG. 1 having a device stored therein.
Figure 6:
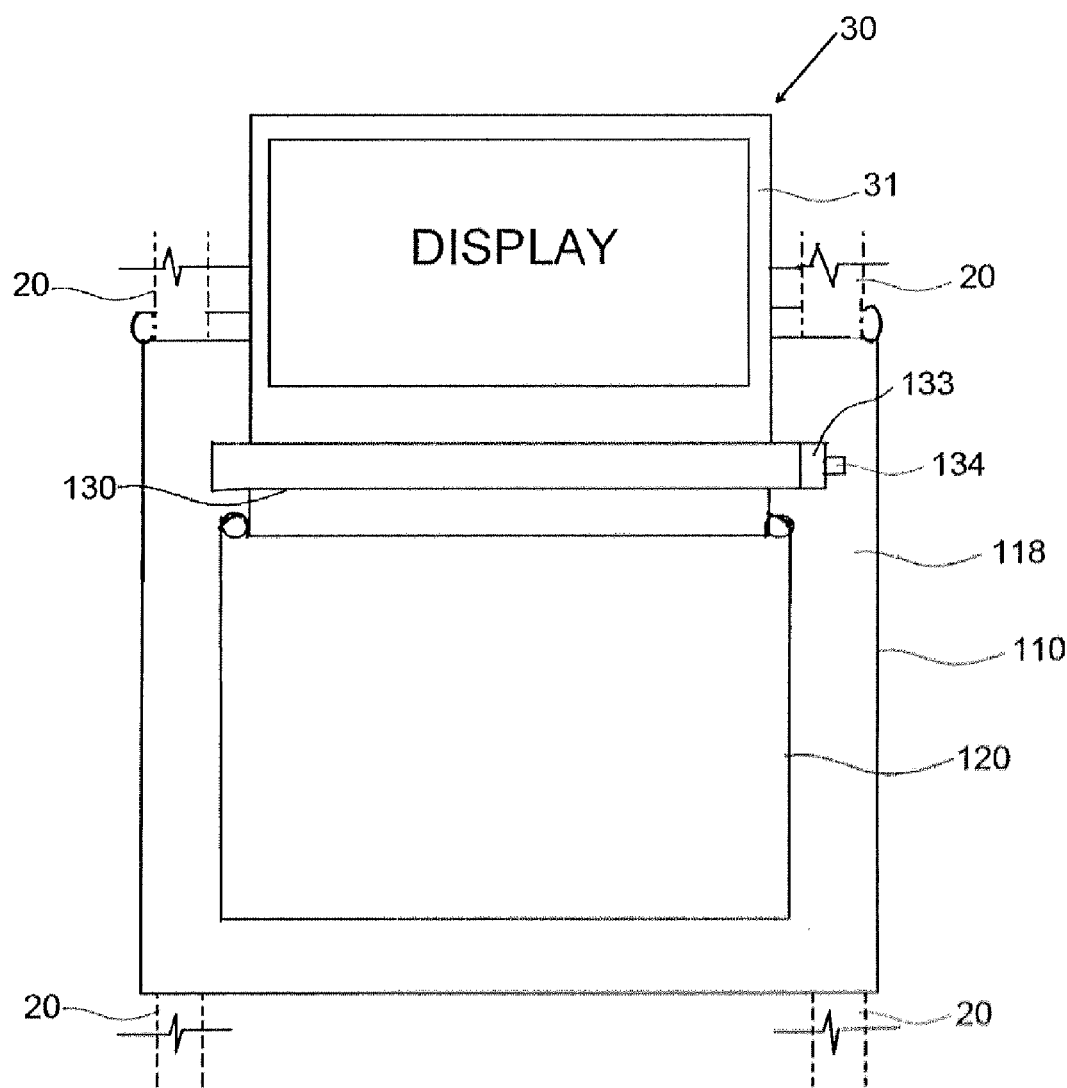
FIG. 6 is a front perspective view of the device holder of FIG. 1 having a device stored therein and secured by a fixing member.

Referring to FIGS. 4 through 6, a device 30 may be inserted into the cavity 127 through the opening 128 of the device storage compartment 120. The second end 132 of the fixing member 130 may be wrapped across a front side of the device 30 in order to couple the first securing portion 133 with the second securing portion 134 to thereby secure the device 30 to the device holder 100. However, the present general inventive concept is not limited thereto. That is, in alternative exemplary embodiments, the fixing member 130 may be configured to secure a portion of the device 30.

Figure 7:
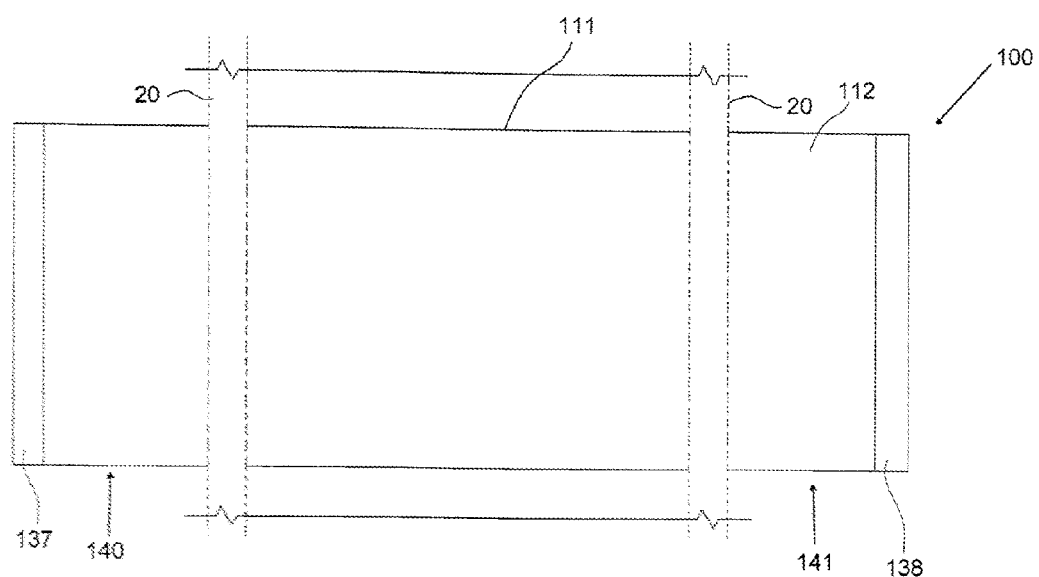
FIG. 7 is a back view of another exemplary embodiment of a device holder according to the present general inventive concept.

Referring to FIG. 7, in an alternative exemplary embodiment, the back side 112 of the device holder 200 may further include securing portions 137 and 138 disposed in a manner such that the back side 112 may be detachably from the front side 111. That is, in an exemplary embodiment, the main body 110 may be formed from a single sheet of material having a first end 140 and a second end 141, wherein the securing portions 137 and 138 allow for the first end 140 to be detachably coupled to the second end 141. The securing portions 137 and 138 may be similar or substantially similar to the coupling devices of the first and second securing portions 133 and 134. However, the present general inventive concept is not limited thereto. That is, the securing portions 137 and 138 may also include any detachable coupling device known in the art.

In an exemplary embodiment, the device holder 100 may be attached to the stroller 20 by first detaching the first end 140 from the second end 141 and then positioning the device holder 200 onto the stroller 10 such that the device storage compartment 120 faces the user storage compartment 40. The securing portion 137 may then be attached the securing portion 138 to thereby assemble the device holder 200 onto the stroller 10.

Figure 8:
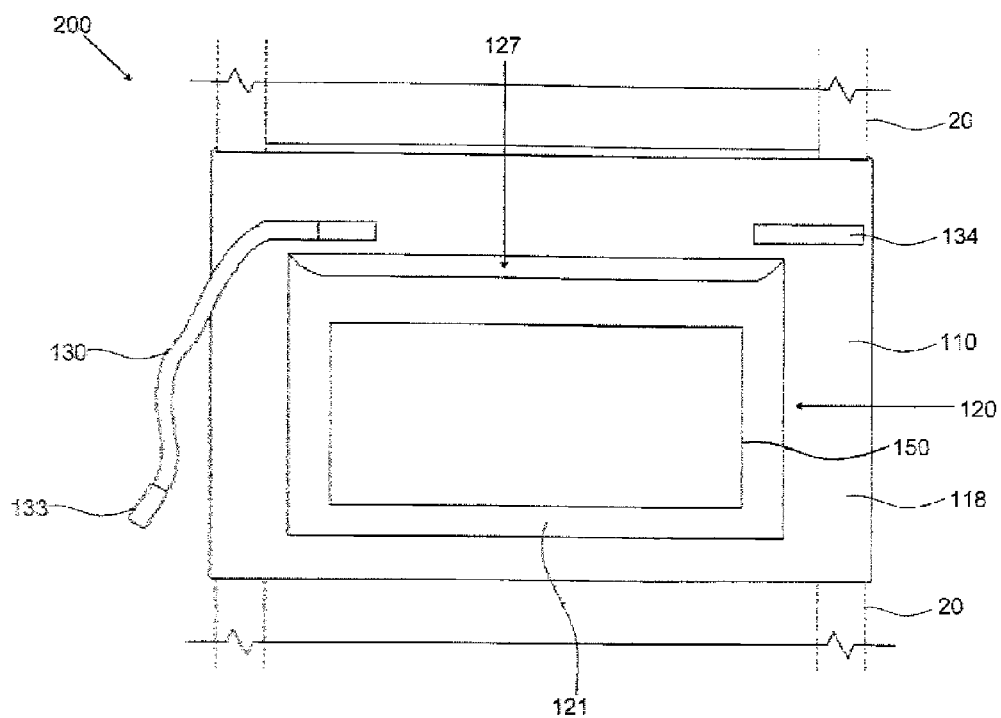
FIG. 8 is a front perspective view of another exemplary embodiment of a device holder according to the present general inventive concept.

Referring now to FIG. 8, in an alternative exemplary embodiment of the present general inventive concept, the device holder 200 includes a device storage compartment 120 which may include a portion 150 disposed on a front wall 121 to thereby provide visibility to a device 30 stored within the device storage compartment 120. In exemplary embodiments, the transparent portion 150 may be formed of a transparent thermoplastic material. However, the present general inventive concept is not limited thereto.

Figure 9:
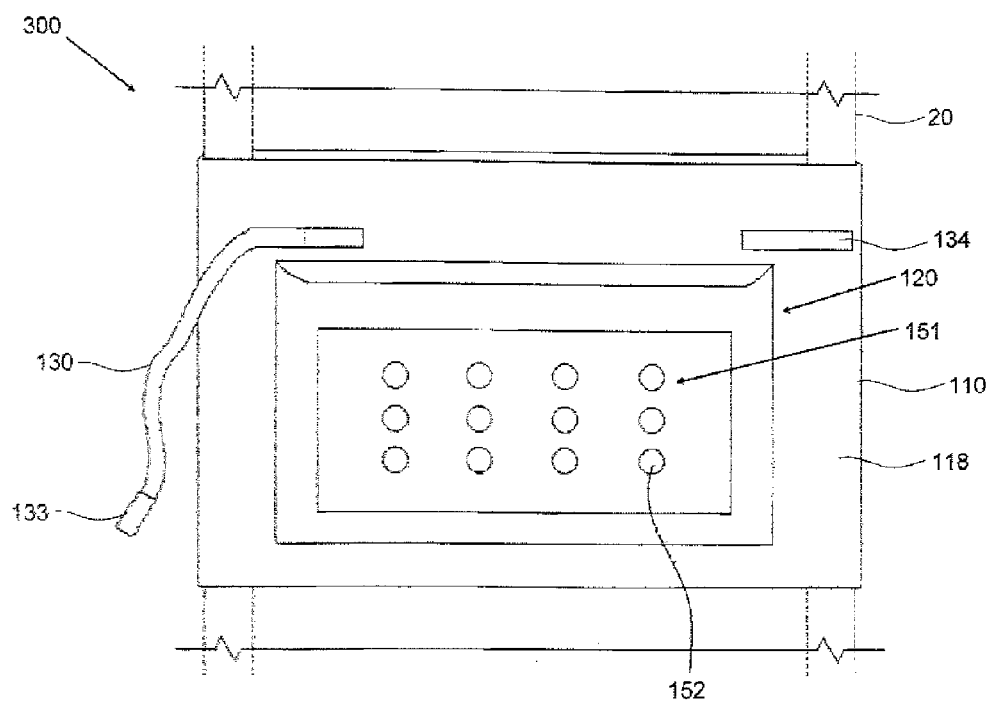
FIG. 9 is a back view of another exemplary embodiment of a device holder according to the present general inventive concept in an unassembled state.

Referring now to FIG. 9, in an alternative exemplary embodiment of the present general inventive concept, the device holder 300 includes a device storage compartment 120 which includes similar elements and features as described above and also includes a penetrating portion 151 disposed on a front wall 121 of the device storage compartment 120. In exemplary embodiments, the penetrating portion 151 includes a plurality of thru-holes 152 which may correspond to user input portions, such as buttons, of a device 30 stored within the device storage compartment 120. In exemplary embodiments, the penetrating portion 151 may be formed in a circular shape. However, the present general inventive concept is not limited thereto. That is, in exemplary embodiments, the penetrating portion 151 may correspond to a size, shape, and location of input portions of the device 30.

Figure 10:
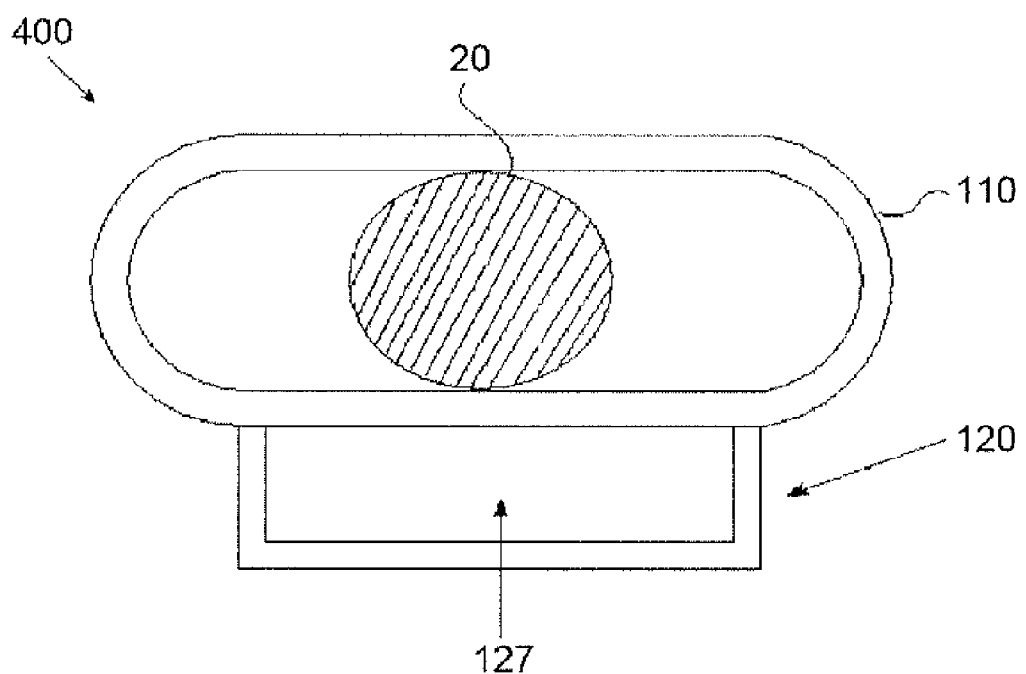
FIG. 10 is a top plan cross-sectional view illustrating a device holder according to an exemplary embodiment of the present general inventive concept.

Referring now to FIG. 10, in an alternative exemplary embodiment of the present general inventive concept, the device holder 400 includes a main body 110 which is capable of being attached to a single handle bar 20 of a stroller 10. That is, in the current exemplary embodiment, the main body 110 may include a dimension which corresponds to a dimension of a single handle bar 20 of a stroller so that the main body 110 may be detachably coupled to the single handle bar 20.

Figure 11:
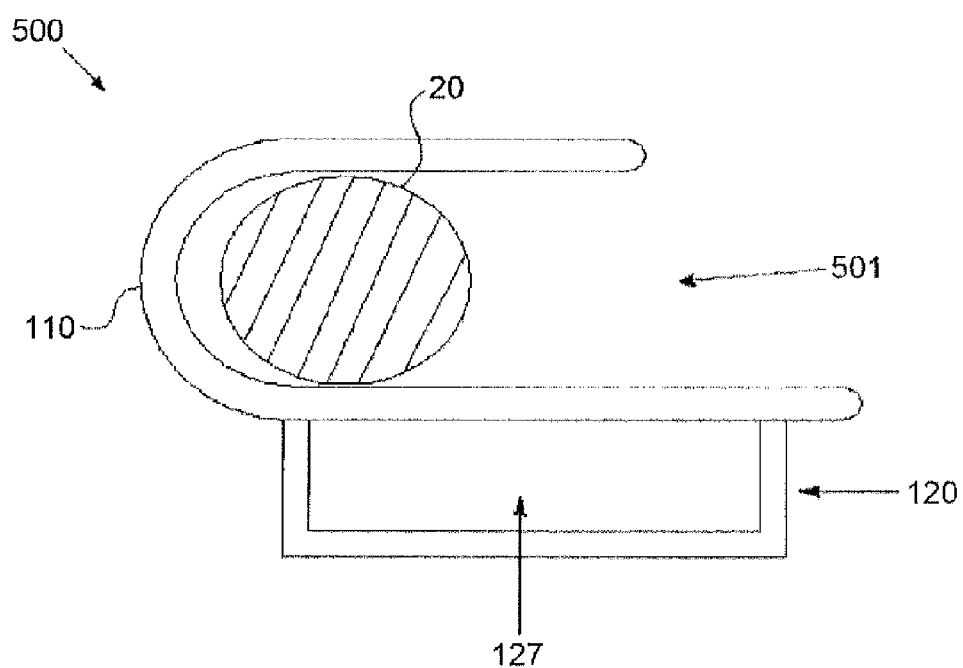
FIG. 11 is a top plan cross-sectional view illustrating a device holder according to an exemplary embodiment of the present general inventive concept.

Referring now to FIG. 11, in an alternative exemplary embodiment of the present general inventive concept, the device holder 500 includes a main body 110 which is open on at least one side in order to be detachably coupled to a single handle bar 20 of the stroller 10. That is, the main body 110 may be formed in a u-shape such that the device holder 500 may be detachably coupled to the handle bar 20 of the stroller 10 by inserting/removing the device holder 500 from the handle bar 20 through an opening 501 of the main body.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An apparatus for a stroller for a stroller comprising:
a cylindrical shaped main body surface of a device holder having an interior void fitting around handlebars of a stroller, the cylindrical shaped main body forming a plane extending between handlebars of a stroller filling a void otherwise existent between the handlebars, said main body surface comprising an area for securely attaching an electronic device, having a screen, to the main body surface to position the electronic device between the handlebars of the stroller permitting viewing of the screen by a child seated in the stroller, said area of the main body surface being at least as high as a height of the electronic device, wherein the device holder secures the electronic device between the handlebars of the stroller; and
an angle adjustment mechanism having a pivot hinge at a bottom portion of the main body surface of the plane extending between the handlebars of the stroller, the angle adjustment mechanism of the device holder permitting angular adjustments of the electronic device, wherein the angular adjustments pivots at the bottom positioned pivot hinge, wherein the angular adjustments permit a set of adjustments for the screen of the electronic device relative to a line of sight of the child seated in the stroller, wherein the angle adjustment mechanism permits the screen of the electronic device to adjust to establish an approximately ninety degree angle between a planar surface of the screen and eyes of the child in a default position for which the user storage compartment is designed, wherein the angle adjustment mechanism permits at least a thirty degree adjustment of a surface of the screen relative to a line of sight of the child.

2. The apparatus of claim 1, wherein the angle adjustment mechanism permits at least a one hundred and eighty degree adjustment, wherein a first adjusted position of the angle adjustment mechanism establishes approximately ninety degree angle between the planar surface of the screen and eyes of the child seated in the stroller, wherein a second adjusted position of the angle adjustment mechanism establishes an approximately ninety degree angle between a planar surface of the screen and eyes of a person pushing the stroller via the handlebars, such that the child seated in the stroller is facing the person pushing the stroller, wherein when in the second adjusted position, the child lacks line of sight viewing of the screen.

3. The apparatus of claim 1, wherein the device holder has a width which is a width plus or minus ten percent of the width between the handlebars measured at a position of connection, wherein the device holder has a height greater than a height of an electronic device and less than twice a height of the electronic device, wherein the device holder has a depth of approximately twice a radius of the handlebars measured at a position of connection, which is a depth plus or minus twenty five percent of twice the radius of the handlebars.

4. The apparatus of the claim 1, wherein the main body surface accommodates a seven-inch touch-screen tablet computer, which is the electronic device, wherein a width of the main body surface is greater than a width of the seven-inch touch-screen tablet, wherein a height of the main body surface is greater than a height of the seven-inch touch screen tablet.

5. The apparatus of the claim 1, wherein the main body surface accommodates a greater-than eight-inch touch-screen tablet computer, which is the electronic device, wherein a width of the main body surface is greater than a width of the greater-than-eight-inch touch-screen tablet, wherein a height of the main body surface is greater than a height of the greater-than-eight-inch touch-screen tablet.

6. The apparatus of the claim 1, wherein the main body surface comprises at least one storage compartment for storing paraphernalia between the handlebars while the electronic device is attached to the main body surface.

7. An system for child transport for a stroller comprising:
a stroller comprising a user storage compartment with a cavity for holding a child in the stroller, wherein the stroller is rear-facing such that when the child is positioned in the cavity, the child faces a direction of the handlebars, wherein the stroller is a wheeled apparatus designed for human locomotion via one human, referred to as a pusher, manually moving and navigating the wheeled apparatus by manually pushing handlebars of the wheeled apparatus so as to transport the child contained within the cavity of the transport apparatus;
a cylindrical shaped main body surface of a device holder having an interior void fitting around the handlebars of the stroller, the cylindrical shaped main body forming a plane extending between the handlebars of the stroller filling a void otherwise existent between the handlebars, said main body surface comprising an area for securely attaching an electronic device, having a screen, to the main body surface to position the electronic device between the handlebars of the stroller, wherein the main body surface has a height greater than a height of an electronic device and less than twice a height of the electronic device, wherein the device holder positioned between the handlebars has a depth of approximately twice a radius of the handlebars measured at a position of connection, which is a depth plus or minus twenty five percent of twice the radius of the handlebars; and
an angle adjustment mechanism having a pivot hinge at a bottom portion of the main body surface of the plane extending between the handlebars of the stroller, the angle adjustment mechanism of the device holder permitting angular adjustments of the electronic device.

8. The system of claim 7, wherein the device holder is fixable attached around an outer circumference of the handlebars of the stroller, which secures the device holder in a substantially fixed position relative to the stroller, wherein friction between a material of the device holder and the handle bars, a coupling mechanism between the device holder and the handle bars, or both is utilized to couple the device holder to the handlebars of the stroller, wherein the main body surface forms a relatively rigid plane extending between the handlebars having sufficient support strength to support the electronic device in an approximately stable position between the handlebars.

9. The system-of claim 7, wherein the electronic device is a touch-screen device, wherein the touch-screen device is positioned for the screen to be operationally touched by the child in the cavity of the stroller, wherein the electronic device is a touch-screen computer having at least a seven inch touch-screen.

10. The system of claim 7, wherein the main body surface accommodates a seven-inch touch-screen tablet computer, which is the electronic device, wherein a width of the main body surface is greater than a width of the seven-inch touch-screen tablet, wherein a height of the main body surface is greater than a height of the seven-inch touch screen tablet.

11. The system of claim 7, wherein the main body surface accommodates a greater-than-eight-inch touch-screen tablet computer, which is the electronic device, wherein a width of the main body surface is greater than a width of the greater-than eight-inch touch-screen tablet, wherein a height of the main body surface is greater than a height of the greater-than-eight-inch touch-screen tablet.

12. The system of claim 7, wherein the main body surface comprises at least one storage compartment for storing paraphernalia between the handlebars while the electronic device is attached to the main body surface.

13. The system of claim 7, wherein the angle adjustment mechanism permit a set of adjustments for the screen of the electronic device relative to a line of sight of the child positioned in the cavity of the user storage compartment, wherein the angle adjustment mechanism permits the screen of the electronic device to adjust to establish an approximately ninety degree angle between a planar surface of the screen and eyes of the child positioned in the cavity.

14. The system of claim 7, wherein the stroller collapses for ease of transport, wherein the device holder coupled to the handlebars does not prevent the stroller from collapsing for transport, whereby the device holder need not be removed from the handlebars when collapsing the stroller.

15. An apparatus comprising:
- a main body of a device holder having an interior void fitting around handlebars of a transport apparatus, said main body having edges in a cylindrical shape designed to fit over the handlebars so that the handlebars are in the interior of the cylindrical shape, wherein the cylindrical shape of the main body has a uniform height, said main body surrounding the handlebars when the main body is attached to the handlebars, thereby securing the main body to handle bars of the transport apparatus, a device holder for securing an electronic device between handle-bars of the transport apparatus, wherein the transport apparatus is a wheeled apparatus designed for human locomotion via one human, referred to as a pusher, manually moving and navigating the wheeled apparatus by manually pushing handles of the wheeled apparatus so as to transport a rider contained within a user storage compartment of the transport apparatus, wherein the transport apparatus is rear-facing such that when the rider is positioned in the user storage compartment, the rider faces a direction of the handlebars, wherein the device holder secures the electronic device between handlebars of the transport apparatus;
- a main body surface of the main body forming a plane extending between the handlebars of the transport apparatus filling a void otherwise existent between the handlebars, said main body surface comprising an area for securely attaching an electronic device, having a screen, to the main body surface to position the electronic device between the handlebars of the transport apparatus permitting viewing of the screen by the rider, said area of the main body surface being at least as high as a height of the electronic device,
- a device storage compartment disposed on the main body to store the electronic device therein, wherein a width of the main body corresponds to a width between the two handles of the transport apparatus, wherein a height and the width of the main body is at least as great as a height and width of the device storage compartment, wherein the height and width of the device storage compartment is at least as great as a height and width of the device, wherein the main body is coupled to the transport apparatus to provide a line of sight to the rider of the transport apparatus to a screen of the electronic device; and
- an angle adjustment mechanism having a pivot hinge at a bottom portion of the main body surface of the plane extending between the handlebars of the transport apparatus, the angle adjustment mechanism of the device holder permitting angular adjustments of the electronic device.

16. The apparatus of claim 15, wherein the transport apparatus is a rearward facing stroller, wherein the electronic device is a touch-screen device having at least a seven inch screen.

17. The apparatus of claim 15, wherein
- the angular adjustments of the angle adjustment mechanism permit a set of adjustments for the screen of the electronic device relative to a line of sight of the rider positioned in the cavity of the user storage compartment, wherein the angle adjustment mechanism permits the screen of the electronic device to adjust to establish an approximately ninety degree angle between a planar surface of the screen and eyes of the rider positioned in the cavity in a default position for which the user storage compartment is designed, wherein the angle adjustment mechanism permits at least a thirty degree adjustment of a surface of the screen relative to a line of sight of the rider.

18. The apparatus of claim 15, wherein the device holder has a width which is a width plus or minus ten percent of the width between the handlebars measured at a position of connection, wherein the device holder has a height greater than a height of an electronic device and less than twice a height of the electronic device, wherein the device holder has a depth of approximately twice a radius of the handlebars measured at a position of connection, which is a depth plus or minus twenty five percent of twice the radius of the handlebars.

19. The apparatus of claim 15, wherein the device holder is attached around an outer circumference of the handlebars of the transport apparatus, which secures the device holder in a substantially fixed position relative to the transport apparatus, wherein friction between a material of the device holder and the handle bars, a coupling mechanism between the device holder and the handlebars, or both is utilized to couple the device holder to the handlebars of the transport apparatus, wherein the main body surface forms a relatively rigid plane extending between the handlebars having sufficient support strength to support the electronic device in an approximately stable position between the handlebars.

\* \* \* \* \*